US012663400B2

(12) United States Patent
Aritome et al.

(10) Patent No.: US 12,663,400 B2
(45) Date of Patent: Jun. 23, 2026

(54) CAPILLARY ARRAY UNIT AND ELECTROPHORESIS DEVICE

(71) Applicant: HITACHI HIGH-TECH CORPORATION, Tokyo (JP)

(72) Inventors: Katsuhiro Aritome, Tokyo (JP); Takeshi Ooura, Tokyo (JP); Asami Terakado, Tokyo (JP); Nobuyuki Isoshima, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 668 days.

(21) Appl. No.: 17/905,276

(22) PCT Filed: Feb. 15, 2021

(86) PCT No.: PCT/JP2021/005526
§ 371 (c)(1),
(2) Date: Aug. 30, 2022

(87) PCT Pub. No.: WO2021/177011
PCT Pub. Date: Sep. 10, 2021

(65) Prior Publication Data
US 2023/0094934 A1 Mar. 30, 2023

(30) Foreign Application Priority Data

Mar. 2, 2020 (JP) ................................. 2020-034606

(51) Int. Cl.
*G01N 27/447* (2006.01)

(52) U.S. Cl.
CPC . *G01N 27/44704* (2013.01); *G01N 27/44708* (2013.01)

(58) Field of Classification Search
CPC ....... G01N 27/44704; G01N 27/44708; G01N 27/447
See application file for complete search history.

(56) References Cited

U.S. PATENT DOCUMENTS 6,558,522 B1 * 5/2003 Williams ............... B01D 57/02
204/459
2002/0003091 A1 * 1/2002 Kojima ............ G01N 27/44704
204/603

(Continued)

FOREIGN PATENT DOCUMENTS

JP 2001-099813 A 4/2001
JP 2001-324473 A 11/2001

(Continued)

OTHER PUBLICATIONS

ABI Prism 310 Genetic Analyzer, 2010 (Year: 2010).*

(Continued)

*Primary Examiner* — Luan V Van
*Assistant Examiner* — Randall Lee Gamble, Jr.
(74) *Attorney, Agent, or Firm* — Baker Botts L.L.P.

(57) ABSTRACT

It is an object of the present invention to provide an electrophoresis device that allows for reducing the temperature variation in the thermostat and that makes it easy to attach/detach the capillary. The electrophoresis device according to an aspect of the present invention includes: a capillary array unit that includes a capillary and a support that supports the capillary; a pump mechanism having one end of the capillary being connected thereto and for delivering a separation medium to the capillary; a detection unit that emits light to a portion of the capillary and performs a measurement on a sample in the capillary; and a thermostat that houses the capillary therein and performs temperature control on the capillary, in which the thermostat includes a heat source and a fan that sends air into the thermostat, and in which the thermostat or the capillary array unit includes a straightening plate.

16 Claims, 7 Drawing Sheets

(56) References Cited

U.S. PATENT DOCUMENTS

| | | | | |
|---|---|---|---|---|
| 2003/0116438 A1 | 6/2003 | Yamazaki et al. | | |
| 2003/0201180 A1 | 10/2003 | Furukawa et al. | | |
| 2005/0284761 A1* | 12/2005 | Amirkhanian | ... | G01N 27/44721 |
| | | | | 204/601 |
| 2006/0096863 A1* | 5/2006 | Yamazaki | ........ | G01N 27/44708 |
| | | | | 204/601 |
| 2006/0219559 A1 | 10/2006 | Ugai et al. | | |
| 2008/0269076 A1* | 10/2008 | Ermakov | ............... | B82Y 30/00 |
| | | | | 506/40 |
| 2009/0183990 A1 | 7/2009 | Shoji et al. | | |
| 2010/0317092 A1* | 12/2010 | Suzuki | ............... | A61B 5/14532 |
| | | | | 435/287.1 |
| 2015/0020614 A1* | 1/2015 | Gettings | .............. | G08B 29/181 |
| | | | | 73/865.8 |
| 2016/0331272 A1* | 11/2016 | Ahmad | .................. | A61B 5/082 |
| 2017/0176385 A1* | 6/2017 | Walton | ............. | G01N 27/44743 |
| 2019/0195919 A1* | 6/2019 | Kasai | ..................... | G01R 15/16 |
| 2021/0341419 A1 | 11/2021 | Aritome et al. | | |

FOREIGN PATENT DOCUMENTS

| | | | |
|---|---|---|---|
| JP | 2003-185629 | A | 7/2003 |
| JP | 2003-315309 | A | 11/2003 |
| JP | 2006-284530 | A | 10/2006 |
| JP | 2007-064774 | A | 3/2007 |
| JP | 2010-249539 | A | 11/2010 |
| JP | 2012-098309 | A | 5/2012 |
| WO | WO 2020/050193 | A1 | 3/2020 |

OTHER PUBLICATIONS

Footprinting with an Automated Capillary DNA Sequencer, BioTechniques 29:1034-1041 (Year: 2000).*
International Search Report, mailed Apr. 20, 2021, for International Application No. PCT/JP2021/005526.

* cited by examiner

FIG. 5
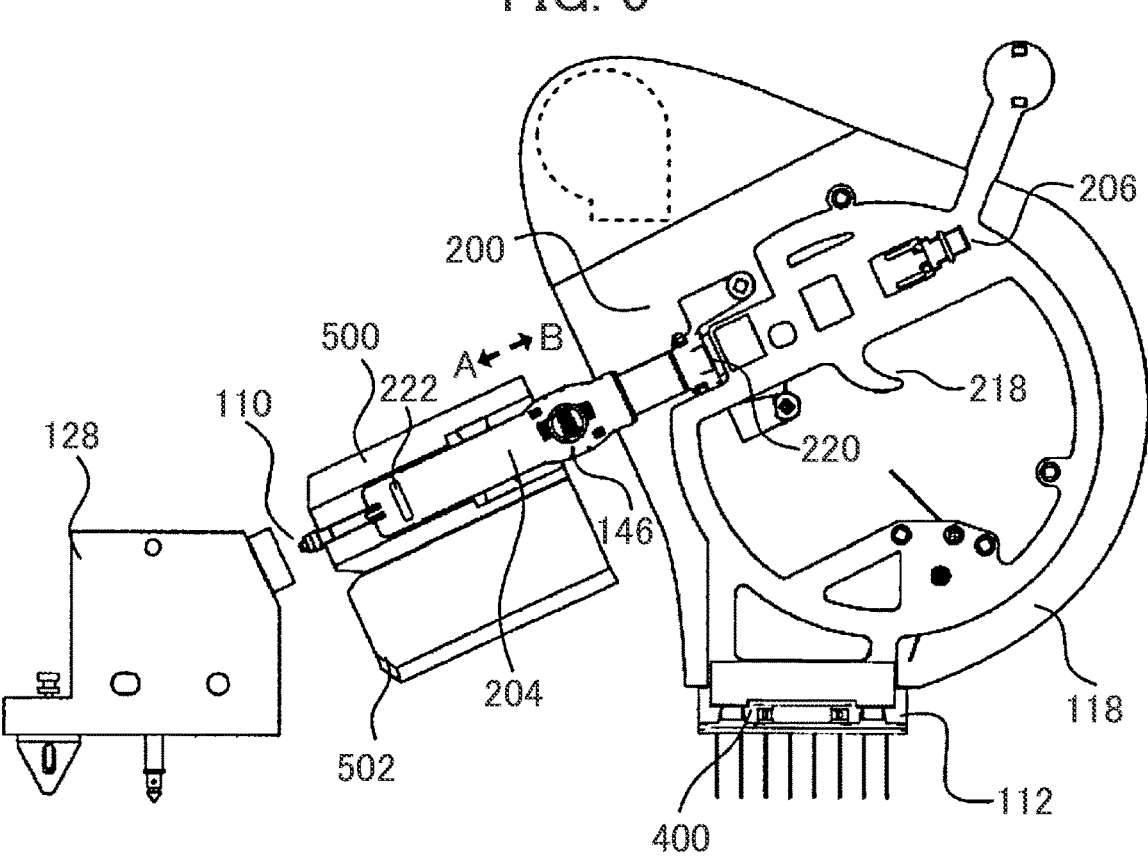
FIG. 6A
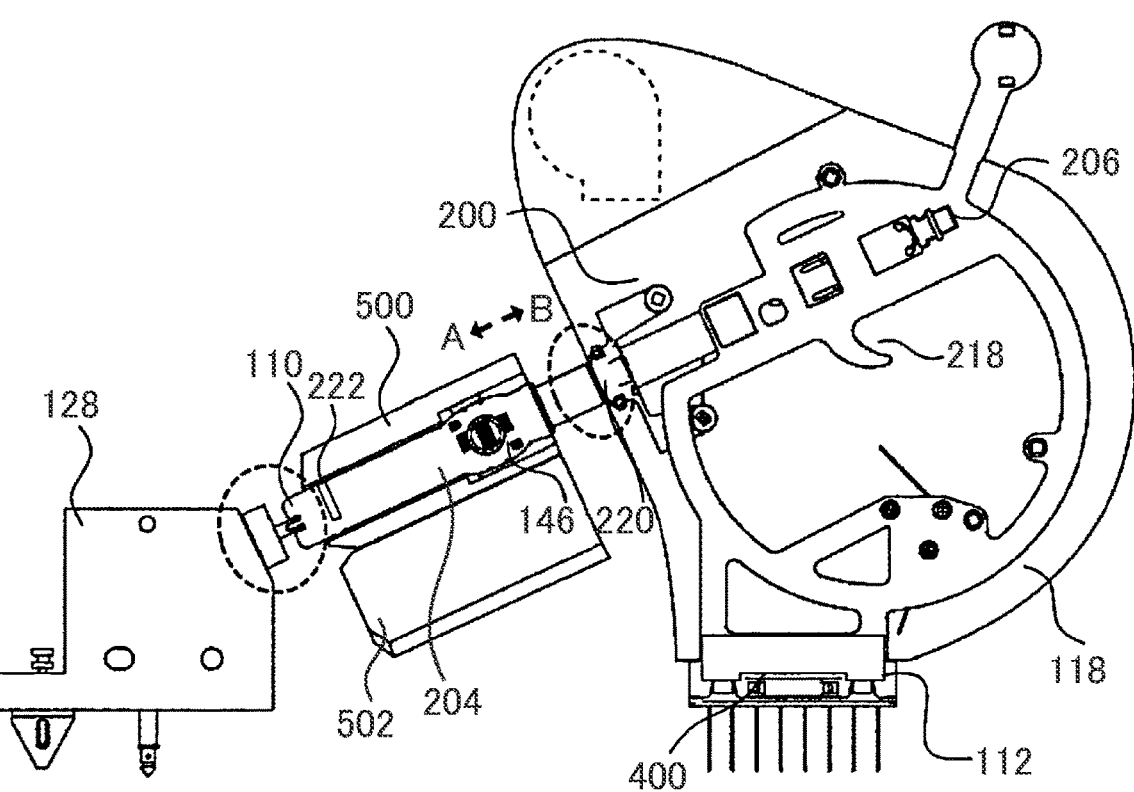

CAPILLARY ARRAY UNIT AND ELECTROPHORESIS DEVICE

TECHNICAL FIELD

The present invention relates to an electrophoresis device, and specifically to attachability of a capillary array unit and an air thermostat in the electrophoresis device.

BACKGROUND ART

A capillary electrophoresis method has been widely spread as a technique of separation analysis performed on a variety of biological samples such as deoxyribonucleic acid (DNA). The capillary electrophoresis is a technique of separating the sample by keeping a capillary filled with a migration medium at a constant temperature and applying a high voltage. It is important to keep the capillary at a constant temperature for achieving analysis performance since the temperature of the migration medium has an influence on migration speed of the sample and the like. Variation in the wind velocity in the thermostat may also cause the variation in the temperature of the capillary, which may degrade the analysis performance.

Patent Literature 1 discloses a detachable wind direction control plate that forms a flow passage for swirling air exiting a discharge port of a fan in the thermostat in accordance with the length or the number of the capillaries. Even if the length or the number of the capillaries changes, it is possible to adjust the temperature of the entire capillary at a constant wind velocity and to reduce the variation in the temperature of the capillary.

CITATION LIST

Patent Literature

Patent Literature 1: Japanese Unexamined Patent Application Publication No. 2010-249539

SUMMARY OF INVENTION

Technical Problem

According to Patent Literature 1, the wind direction control plate is arranged in a curved manner along a periphery of the capillary. Therefore, when the capillary is attached to/detached from a pump mechanism, a range of motion of the capillary is limited by the wind direction control plate, which makes it difficult to attach/detach the capillary.

As such, it is an object of the present invention to provide an electrophoresis device that allows for reducing the temperature variation in the thermostat and that makes it easy to attach/detach the capillary.

Solution to Problem

An electrophoresis device according to an aspect of the present invention includes: a capillary array unit that includes a capillary and a support that supports the capillary; a pump mechanism having one end of the capillary being connected thereto and for delivering a separation medium to the capillary; a detection unit that emits light to a portion of the capillary and performs a measurement on a sample in the capillary; and a thermostat that houses the capillary therein and performs temperature control on the capillary, in which the thermostat includes a heat source and a fan that sends air into the thermostat, and in which the thermostat or the capillary array unit includes a straightening plate.

Advantageous Effects of Invention

The electrophoresis device according to an aspect of the present invention makes it possible to reduce the temperature variation in the thermostat and also to facilitate attachment/detachment of the capillary.

BRIEF DESCRIPTION OF DRAWINGS

FIG. 5 shows a state after the load header is attached to the thermostat;

FIG. 6A shows a state after the capillary head is attached to a block;

DESCRIPTION OF EMBODIMENTS

First Embodiment

Figure 1:
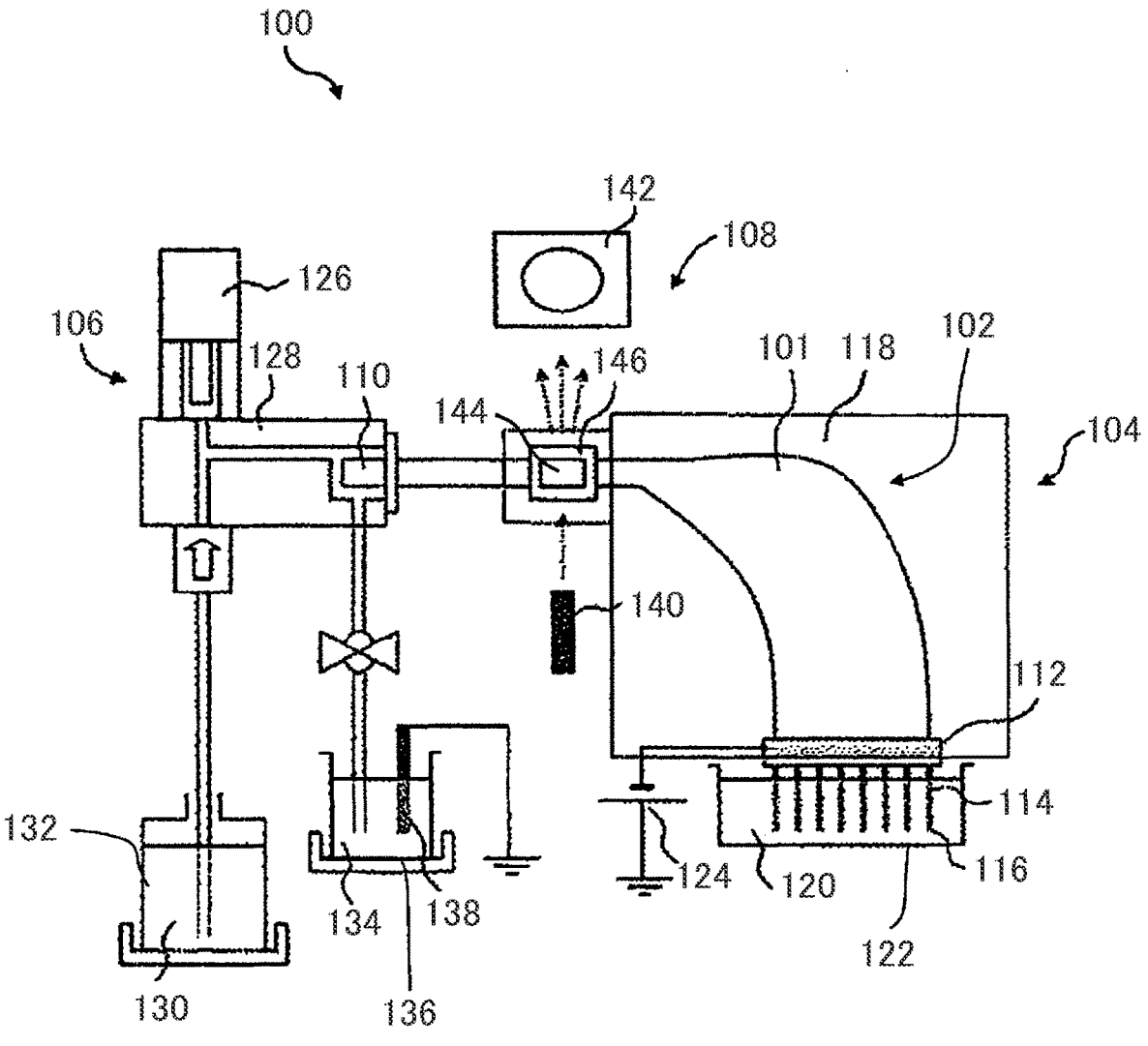
FIG. 1 shows a basic configuration of an electrophoresis device.

FIG. 1 is a schematic diagram showing a basic configuration of an electrophoresis device 100. The electrophoresis device 100 includes a capillary array 102 that mainly includes a capillary 101, an electrophoresis section 104, a liquid delivery mechanism 106 that delivers high-viscosity polymer solution (hereinbelow, referred to as polymer) being a migration medium to the capillary 101, and an irradiation detection unit 108 that optically detects a sample separated by electrophoresis.

The capillary array 102 includes one or more capillaries 101, a capillary head 110, and a load header 112. The capillary array 102 is replaced after being used for a predetermined number of times or when an analysis item is changed. The capillary 101 is a quartz pipe, and a jacket of the capillary 101 is coated with polyimide resin to increase its strength. The capillary head 110 is a member attached to and detached from the liquid delivery mechanism 106 in an airtight and pressure-tight manner. When there are more than one capillaries 102, the capillaries 101 are bundled at one end by the capillary head 110. The load header 112 is provided with a tubular cathode electrode 114. The capillary 101 passes through the cathode electrode 114 and is fixed to the load header 112 with a capillary cathode end 116 protruding from a lower end of the cathode electrode 114. The capillary array 102 is attached and detached as the capillary array unit in a state of being positioned with respect to a frame. A configuration of the capillary array unit will be described later.

The electrophoresis section 104 includes a thermostat 118, a cathode-side buffer container 122 containing a buffer solution 120, and a high voltage power supply 124. The thermostat 118 houses the capillary array 102 therein and controls the temperature of the capillary array 102. For example, a Peltier element may be used as the heat source for the thermostat 118, which makes it possible to set the temperature in a range from a temperature below the room temperature to as high a temperature as 50° C. or even higher. Although not shown in FIG. 1, the thermostat 118 includes a fan which circulates the air in the thermostat 118 to reduce temperature variation in the thermostat. The capillary cathode end 116 and the cathode electrode 114 are immersed in the buffer solution 120 in the cathode-side buffer container 122. In this state, a voltage is applied by the high voltage power supply 124.

The liquid delivery mechanism 106 includes a pump 126, a block 128 having a flow passage therein, a polymer container 132 containing a polymer 130, and an anode-side buffer container 136 containing a buffer solution 134. An anode electrode 138 is immersed in the buffer solution 134 in the anode-side buffer container 136. The block 128 is a connection for communicating the capillary head 110, the polymer container 132, and the anode-side buffer container 136, through which the polymer 130 in the polymer container 132 is delivered to the capillary 101 by the pump 126, or the buffer solution 134 in the anode-side buffer container 136 and the capillary 101 are electrically connected.

The irradiation detection unit 108 includes a light source 140 and a detector 142. Excitation light from the light source 140 falls on a detection position 144 of the capillary 101, and light depending on the sample is emitted from the sample passing through the detection position 144 of the capillary. The emitted light is detected by the detector 142. The detection position 144 of the capillary 101 preferably has its polyimide resin coating detached so that its internal light may leak out. The vicinity of the detection position 144 is arranged and fixed to an optical flat plane as accurately as a few microns height therefrom by a detection section 146 provided to the capillary array 102. The detection section 146 is, for example, a substrate having a groove for aligning the capillary 101.

Now, the electrophoresis method is described. Although not shown in FIG. 1, there is provided an automatic sampler that transfers a sample container (not shown) or the cathode-side buffer container 122 to the capillary cathode end 116. First, the sample container is connected to the capillary cathode end 116 by the automatic sampler. The sample container includes a large number of wells, each well containing solution that includes the sample such as fluorescent-labelled DNA. The capillary cathode end 116 is immersed in the solution including the sample in the well. In this state, by applying a voltage of a few KVs between the anode electrode 138 and the cathode electrode 114 by means of the high voltage power supply 124, the sample is introduced from the capillary cathode end 116 into the capillary 101. Next, the capillary cathode end 116 is inserted in the cathode-side buffer container 122 as shown in FIG. 1. By applying voltage between the anode electrode 138 and the cathode electrode 114 with the capillary cathode end 116 immersed in the buffer solution 120, the sample electrophoretically migrates in the capillary 101 and gets separated. The separated sample is detected by the irradiation detection unit 108.

Figure 2A:
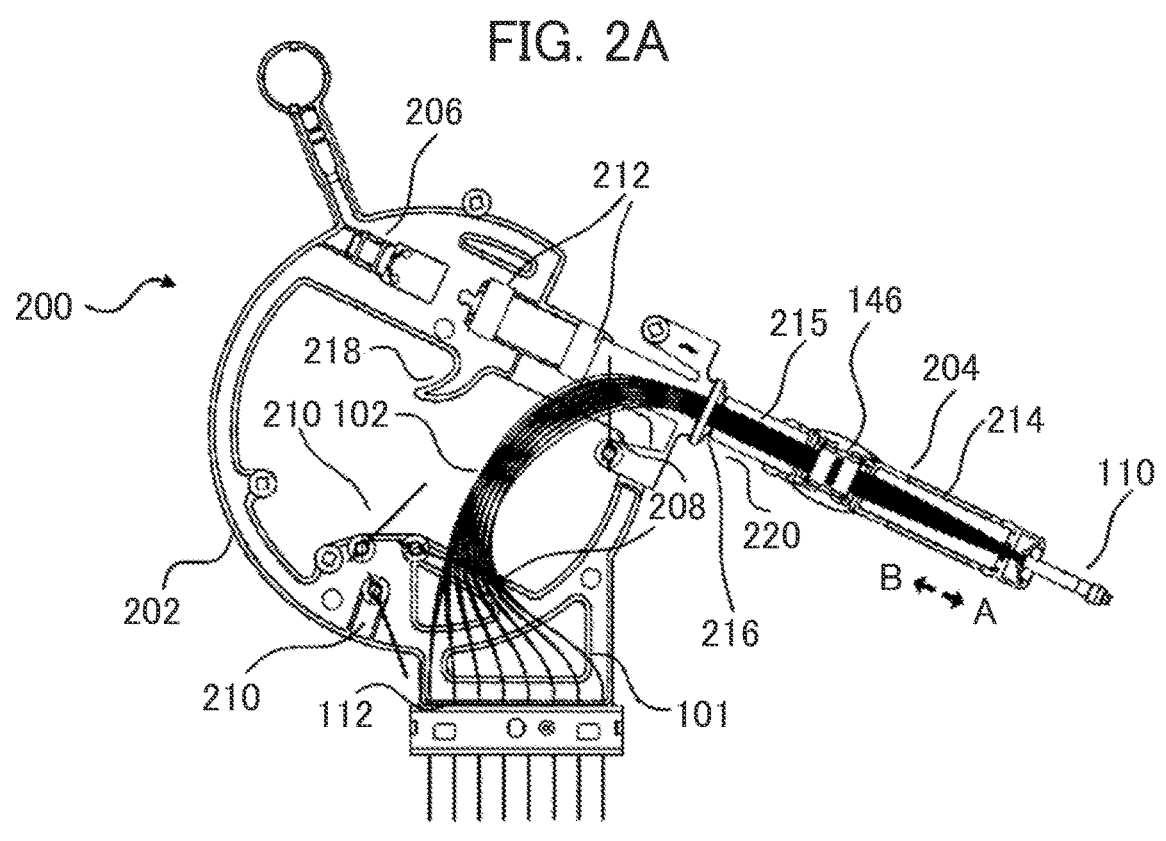
FIG. 2A shows a capillary array unit.

A capillary array unit 200 will be described with reference to FIG. 2A. FIG. 2A is a rear view of the capillary array unit 200. The capillary array unit 200 mainly includes the capillary array 102, a first frame 202 that holds the capillary 101 in a curved state, a second frame 204 that holds the capillary in a linear state, a holding section 206 that holds the second frame 204 in a detachable manner, a separator 208, and a straightening plate 210 for adjusting a direction of wind made by the fan in the thermostat 118.

The first frame 202 is fixed to the load header 112 and integrated with the capillary array 102. The second frame 204 supports a region between the capillary head 110 to the vicinity of the detection section 146 so as to prevent the capillary head 110 and the detection section 146 from hanging down due to gravitational force. The first frame 202 includes a guide 212 for moving the second frame 204 in a predetermined range. The second frame 204 is able to move on a straight line along the guide 212. Although details of an attaching procedure of the capillary array unit will be described later, the capillary head 110 and the liquid delivery mechanism 106 are connected by moving the second frame 204 in a direction of an arrow A, and the capillary head 110 is detached from the liquid delivery mechanism 106 by moving the second frame 204 in a direction of an arrow B. The capillary head 110 has a bore or a groove, and the second frame 204 is provided with a protrusion that engages with the bore or the groove provided in the capillary head 110. This prevents the second frame 204 and the capillary head 110 from coming out when detaching the capillary head 110 from the liquid delivery mechanism 106, allowing for stably pulling the capillary head 110 out of the liquid delivery mechanism 106.

The second frame 204 is bound by the holding section 206 provided to the first frame 202. As the holding section 206, for example, a push latch is used. By moving the second frame 204 not fixed by the holding section 206 in the direction of the arrow B and pushing it into the holding section 206, the second frame 204 is bound by the holding section 206. Moreover, the second frame bound by the holding section 206 is released from the holding section 206 by moving it in the direction of the arrow B and pushing it into the holding section 206 again. The FIG. 2A shows a state of the capillary array unit when the capillary head 110 is connected to the liquid delivery mechanism 106.

Moreover, there is a heat dissipation sheet 214 (215) to improve heat dissipation performance of the capillary 101 between the second frame 204 and the capillary 101. Bringing the heat dissipation sheet 214 (215) and the capillary 101 into contact with each other makes it possible to effectively dissipate the heat generated from the capillary 101 when applying high voltage to the capillary 101 and to improve the analysis performance. There are provided two heat dissipation sheets 214 (215) between the capillary head 110 and the detection section 146 of the second frame 204 and on the upper side of the detection section 146. Above the heat dissipation sheet 215 of the second frame 204, a fixture 216 is connected for arranging the capillary 101 on the heat dissipation sheet 214 (215). The fixture 146 has a groove for retaining the capillary 101 in a predetermined position. A path of the capillary 101 is adjusted by the fixture 146 to be located on the heat dissipation sheet 214. Moreover, the groove may be provided in the second frame 204 at a position where the fixture 146 is arranged or may be provided in the second frame 204 at both positions where the fixture 146 and the fixture 146 are arranged.

Figure 3:
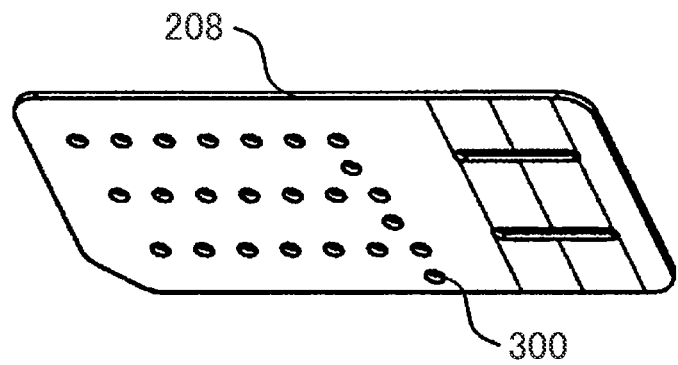
FIG. 3 shows a separator.

The separator 208 (see FIG. 3) is a film-like or plate-like member, in which no smaller number of holes 300 than the number of the capillaries 101 are formed. An internal diameter of the hole 300 is slightly larger than an outer diameter of the capillary 101, which is, for example, about 01 mm. By a single capillary 101 being passed through each of the holes 300, every capillary 101 is retained at its predetermined position. The separator 208 separates the capillaries 101 to prevent the capillaries 101 from being entangled and becoming tight in a bundled state. The number of the separators 208 may be increased or decreased in accordance with the length of the capillary 101 and the separators 208 may be arranged in appropriate positions in accordance with the length of the capillary 101.

Figure 2B:
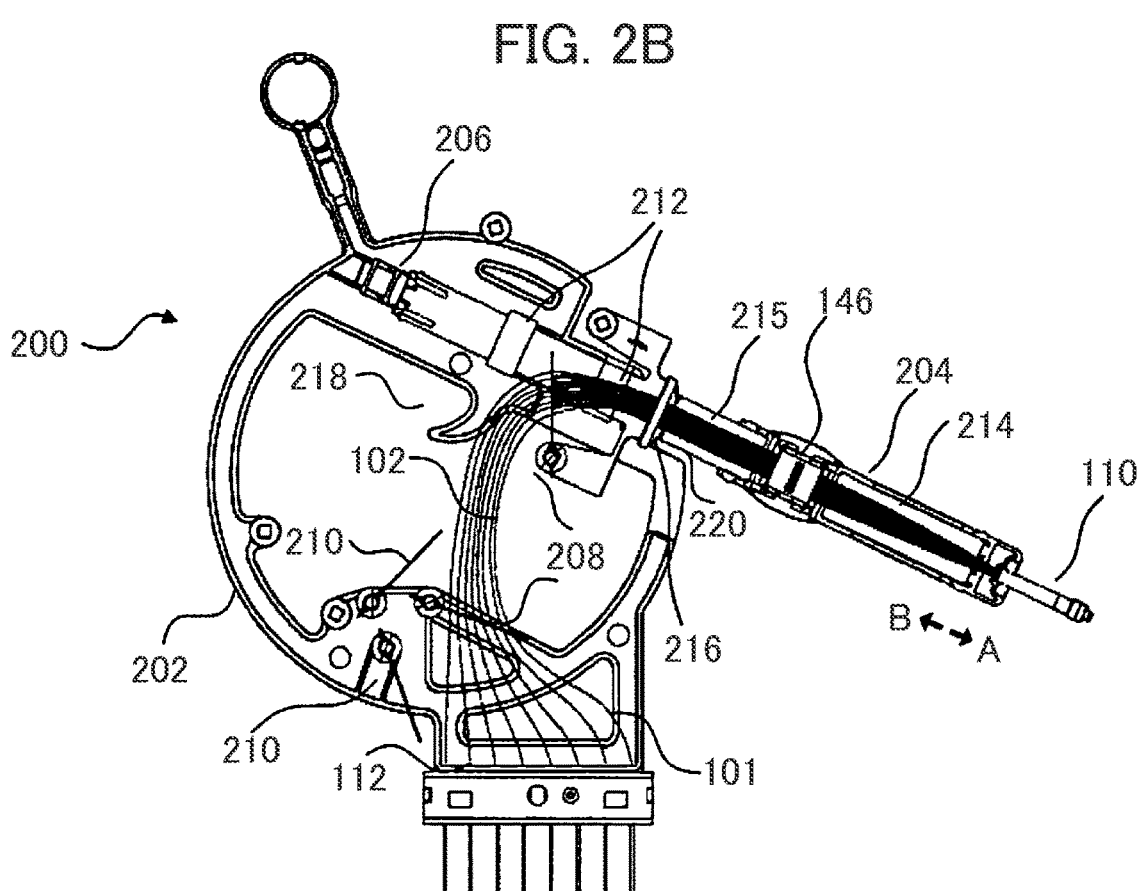
FIG. 2B shows the capillary array unit with its second frame being bound by a holding section.

Furthermore, the capillary array unit 200 according to the present embodiment includes the straightening plate 210 to adjust an air flow in the thermostat 118 when installed in the thermostat 118. The straightening plate 210 is a flat plate-like member. The straightening plate 210 can be attached so as not to obstruct attachment of the capillary array unit 200 not to limit the air flow passage in the thermostat 118 but to adjust the wind direction. FIG. 2B shows a state in which the second frame 204 is bound by the holding section 206. In the state in which the second frame 204 is held by the holding section 206, a curved portion of the capillary 101 largely bulges outwardly. The straightening plate 210 is provided to a portion of a periphery of the capillary 101, and is arranged in a position not contacting the capillary 101 even if the second frame is connected to the liquid delivery mechanism 106 in a state where the second frame 204 is held by the holding section 206, namely outside the range of motion of the capillary 101. Specifically, the straightening plate 210 is arranged below a line running between the capillary head 110 and the detection section 146 when the capillary array 102 is installed in the thermostat 118, namely below the line on which the second frame moves. It is preferable to provide the straightening plate 210 at a position which hardly moves when the second frame 204 is moved. Since the straightening plate 210 is arranged outside the range of motion of the capillary 101 when the second frame 204 is moved, the straightening plate 210 does not obstruct attachment of the capillary array unit 200 and can be easily attached. As the straightening plate 210, a plate-like separator 146 having no capillary 101 passing therethrough may be used. Wind direction control of the straightening plate 210 will be detailed later.

Moreover, in order to further facilitate attachment/detachment of the capillary array unit 200, the first frame 202 includes a finger hook 218 and the second frame 204 includes a push-in section 220 and a knob 222 (see FIG. 5). The push-in section 220 has a step formed thereon such that the second frame 204 can be easily pushed in toward the direction of the arrow B with a finger.

Figure 4:
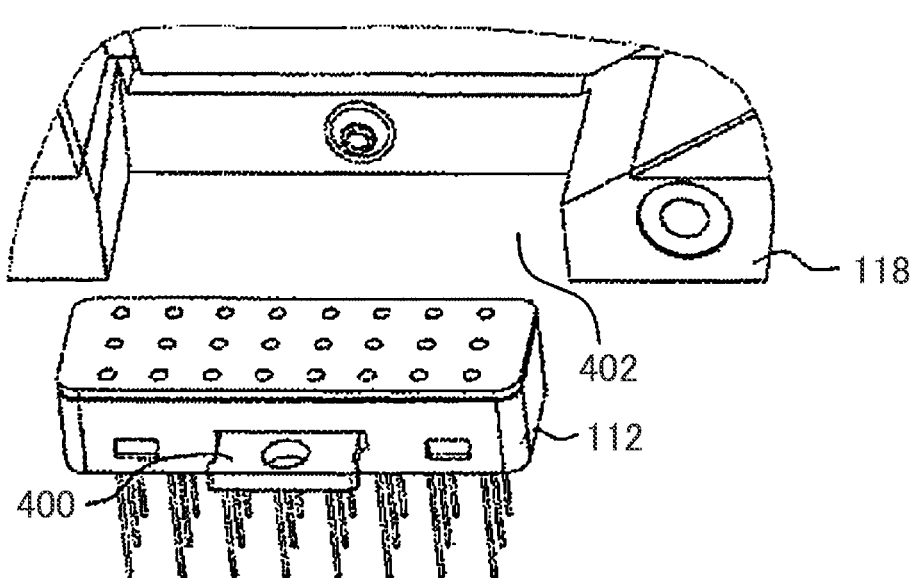
FIG. 4 shows attachment of a load header to the thermostat.

The attaching procedure of the capillary array unit 200 according to an aspect of the present invention is described with reference to FIGS. 4, 5, 6A, and 6B. The capillary array unit 200 is put in a state in which the second frame 204 in FIG. 2A is bound by the holding section 206 before being attached to the thermostat 118. In this state, the load header 112 is attached to the thermostat 118. FIG. 4 shows a portion on a lower side of the thermostat 118 and the load header 112. The capillary 101 attached to the load header 112 is not shown. The load header 112 is provided with a grip 400. A user may grip the grip 400 and inserts the load header 112 into a recess 402 in the thermostat 118. Although not shown, provided on both sides of the load header 112 are grooves, and provided on an inner surface of the recess 402 in the thermostat 118 are projections that engage with the grooves provided on both sides of the load header 112. When the load header 202 is inserted into the recess 402 in the thermostat 118, the groove provided in the load header 202 and the projection provided on the inner surface of the recess 402 in the thermostat 118 are engaged and the capillary array unit 200 is arranged in the thermostat 118 as shown in FIG. 5. Because the capillary head 110 and the detection section 146 are supported by the second frame 204, the capillary head 110 and the detection section 146 come into contact with a detection section holder 500 when installing the load header 112 in the thermostat 118, which can prevent from obstructing attachment. The detection section holder 500 fixes the detection section 146 and locates the detection position 144 with respect to the irradiation detection unit 108. Furthermore, because the capillary array unit 200 is arranged in the thermostat 118 in a state in which the second frame 204 is held by the holding section 206, it can also be prevented that the capillary head 110 and the block 128 collide with each other obstructing the attachment. That is, it is possible to arrange the capillary array unit 200 in the thermostat 118 without any part of the electrophoresis device 100 obstructing the attachment. Only by gripping the grip 400 and inserting the load header 112 into the recess 402 in the thermostat 118, the capillary array unit 200 is installed in the thermostat 118. The capillary array unit 200 is easily installed.

Next, binding by the holding section 206 of the second frame 204 is released. The user places his/her fingers on the finger hook 218 and the push-in section 220 respectively, pushes the push-in section 220 in the direction of the arrow B as if pinching the finger hook 218 and the push-in section 220 with the fingers, and thereby releases the binding of the second frame 204 by the holding section 206. This allows the second frame 204 to move along the guide 212 (see FIG. 2A). By providing the finger hook 218 and the push-in section 220, it is possible to release the binding of the second frame 204 by the holding section 206 with one hand, making it easy to handle.

Figure 6B:
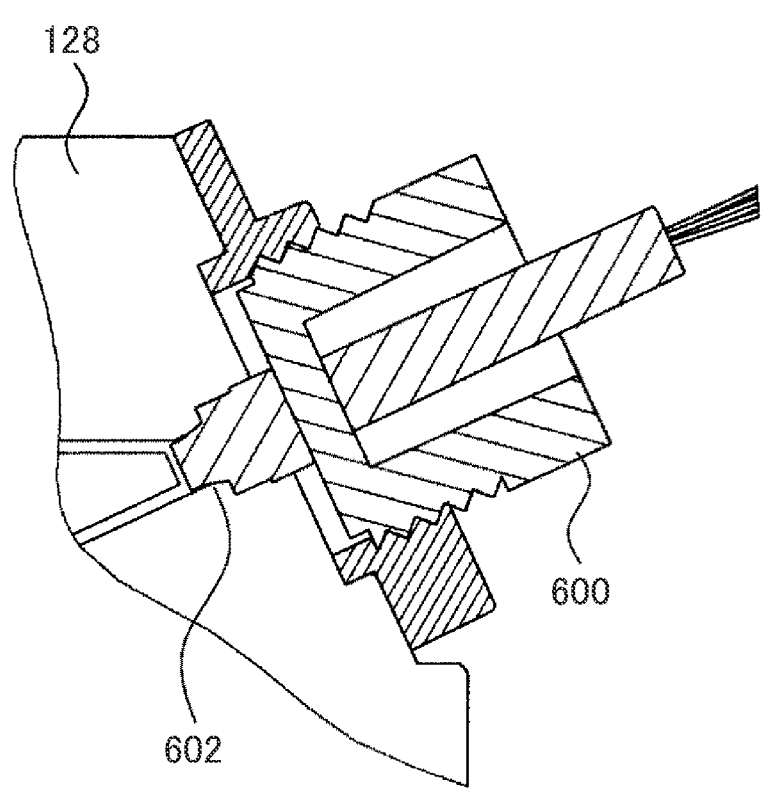
FIG. 6B shows a detail of the attachment of the capillary head to the block.

Subsequently, the second frame 204 is slid in the direction of the arrow A by means of the knob 222 provided to the second frame 204. This allows the capillary head 110 to be inserted into the bore in the block 128 as shown in FIG. 6A. An enlarged view of the connection between the block 128 and the capillary head 110 is shown in FIG. 6B. By screwing a set screw 600 provided to the block 128, a sealing surface 602 of the capillary head 110 is pushed against the block 128. This allows for sealing between the capillary head 110 and the block 128, whereby the capillary head 110 is fixed to the block 128. The capillary 101 and the liquid delivery mechanism 106 are connected by the above-described procedure. By moving the second frame 204 gripping the knob 222, the user can attach the capillary head 110 to the block 128 without any direct contact with the capillary 101. Furthermore, this activity allows the capillary head 110 to be inserted into the bore in the block 128 only by moving the second frame 204 along the guide 212, thereby easily attaching the capillary head 110 to the block 128.

Lastly, the detection section 146 is attached to the detection section holder 500. As shown in FIG. 6A, when the capillary head 110 is connected to the block 128, the detection section 146 is arranged in the detection section holder 500. Accordingly, the detection section 146 can be attached to the detection section holder 500 only by closing a lid 502 of the detection section holder 500, thereby easily attaching the detection section 146.

Subsequently, a detaching procedure of the capillary array unit 200 is described. The detaching procedure of the capillary array unit 200 is a reverse procedure of the above-described attaching procedure.

First, the lid 502 of the detection section holder 500 is opened to release the fixing of the detection section 146.

Next, the capillary head 110 is detached from the block 128. The set screw 600 is loosened to release the fixing of the capillary head 110 to the block 128. Next, the capillary head 110 comes out of the bore of the block 128 by moving the second frame 204 in the direction of the arrow B along the guide 212 by means of the knob 222. By moving the second frame 204 farther in the direction of the arrow B along the guide 212, then placing fingers on the finger hook 218 and the push-in section 220 respectively, and pushing the push-in section 220 in the direction of the arrow B as if pinching the finger hook 218 and the push-in section 220 with the fingers, the second frame 204 is bound by the holding section 206. Lastly, the load header 112 is detached from the thermostat 118 by means of the grip 400. When detaching the capillary array unit 200, it is possible to detach the capillary array unit 200 from the thermostat 118 without being obstructed by the electrophoresis device 100 as with the case of attachment. As described above, the configuration of the capillary array unit 200 according to an aspect of the present invention makes it possible to easily carry out attaching/detaching work of the capillary array unit 200.

Figure 7A:
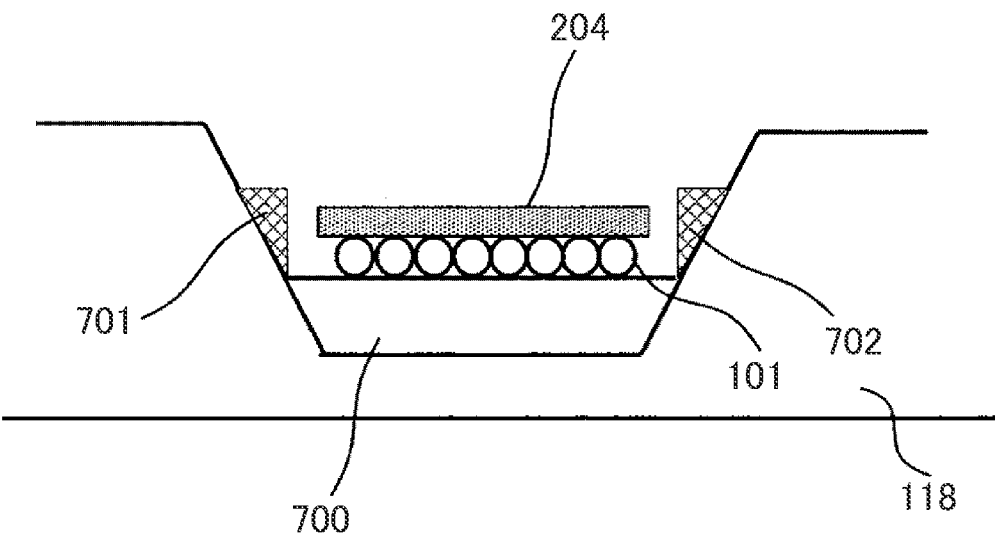
FIG. 7A shows the capillary array unit stuck in the thermostat.
Figure 7B:
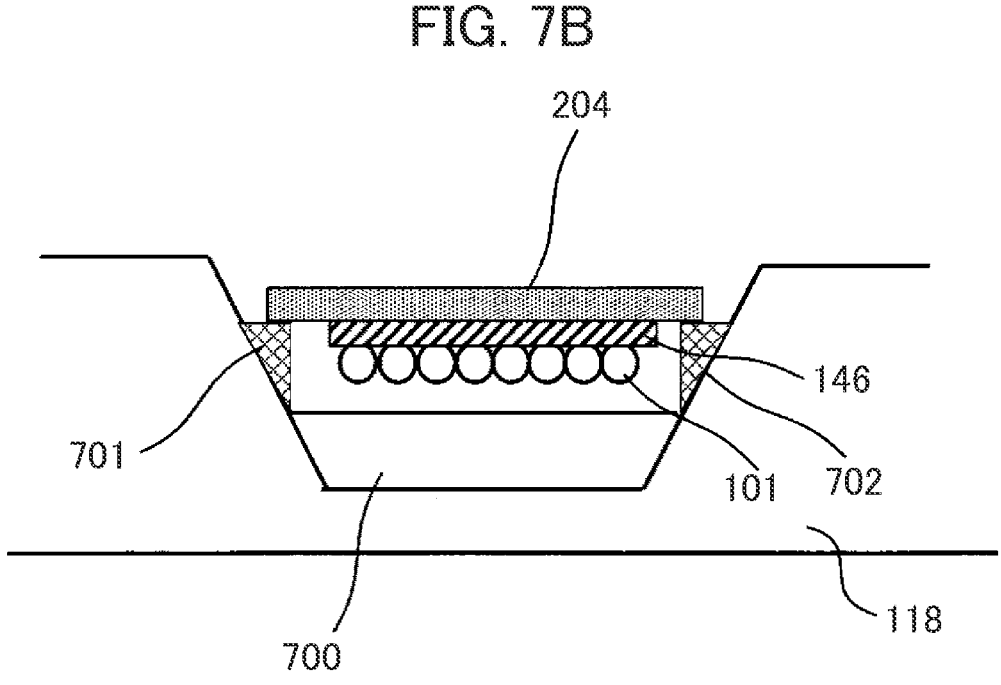
FIG. 7B shows vicinity of a detection section in the second frame and the thermostat.

The reason why the vicinity of the detection section 146 of the second frame 204 is wider than places other than the vicinity of the detection section 146 of the second frame 204 is described. The second frame 204 of the capillary array unit 200 is in the state of protruding from the thermostat 118. The thermostat 118 is of an air circulation type and needs to be sealed for reducing heat-up time and improving temperature stability when controlling temperature. A state in which the capillary array unit 200 is attached to the block 128 and the second frame 204 has passed through the thermostat 118 is shown in FIG. 7A. A portion of the thermostat 118 where the second frame 204 passes is U-shaped. The second frame 204 and the capillary 101 held by the second frame 204 are pinched between an unshown lid provided to the thermostat 118 and the thermostat 118. This configuration allows for sealing the space of the thermostat 118. There is provided a heat dissipation sheet 700 for sealing the thermostat 118 and dissipating heat generated from the capillary 101 on the contact surface between the thermostat 118 and the capillary 101. In the capillary array unit 200 according to the present embodiment, the detection section 146 is slid by the second frame 204. When the detection section 146 moves while in contact with the heat dissipation sheet 700, the heat dissipation sheet 700 is rubbed, leading to breakage of the heat dissipation sheet 700. Therefore, the width of the second frame 204 is made larger in the vicinity of the detection section 146 than the width of the second frame 204 passing through the thermostat 118 when the capillary array unit 200 is attached. FIG. 7B shows when the detection section 146 passes over the heat dissipation sheet 700. A projection 701 (702) is provided on either side of the U-shaped portion of the thermostat 118. By making the width of the second frame 204 larger than a space between the projection 701 and the projection 702, the second frame 204 in the vicinity of the detection section 146 comes onto the projection 701 (702), thus prevents contact between the heat dissipation sheet 700 and the detection section 146, and prevents breakage of the heat dissipation sheet 700 due to rubbing between the detection section 146 and the heat dissipation sheet 700.

Figure 8A:
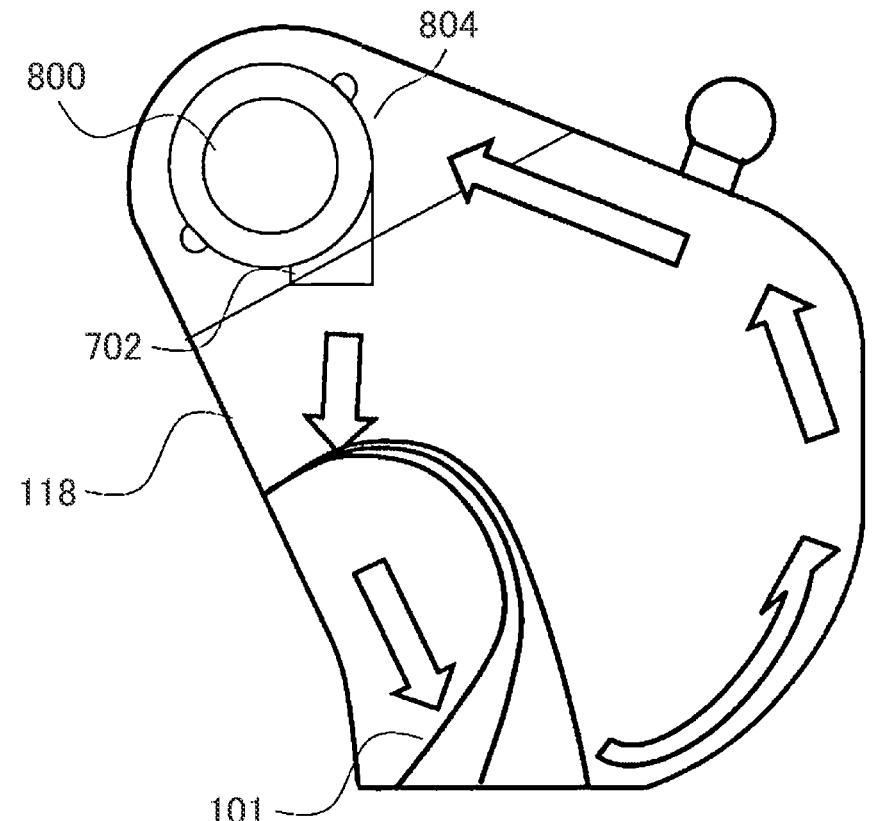
FIG. 8A shows a flow of air in the thermostat when there is no straightening plate.
Figure 8B:
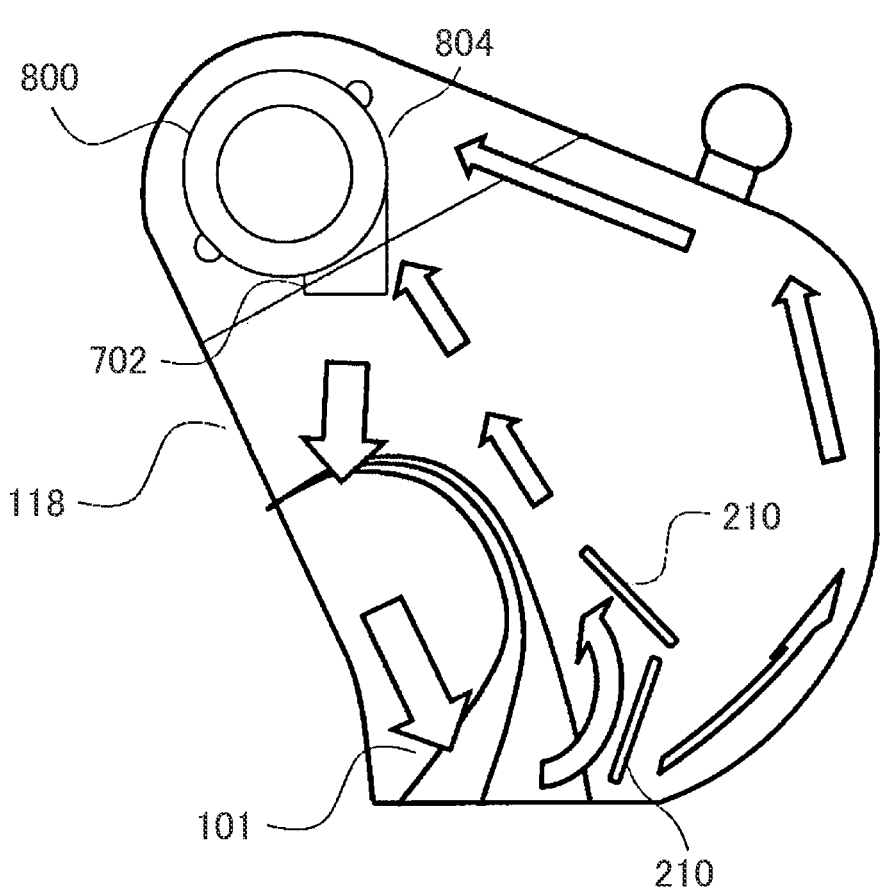
FIG. 8B shows a flow of air in the thermostat when there is a straightening plate.

Subsequently, the air flow adjusted by the straightening plate 210 is described with reference to FIGS. 8A and 8B. FIG. 8A shows the air flow in the thermostat 118 when there is no straightening plate 210, and FIG. 8B shows the air flow in the thermostat 118 when there is the straightening plate 210. Although the capillary array unit 200 is arranged in the thermostat 118, FIGS. 8A and 8B show the arrangement of only the capillary 101 and the straightening plate 210.

The thermostat 118 is provided with a fan 800, and the air in the thermostat 118 is circulated by the fan 800. The fan 800 has two functions: a function of reducing temperature variation by agitating the air in the thermostat; and a function of dissipating Joule heat generated from the capillary 101 during electrophoresis. When there is no straightening plate 210 as shown in FIG. 8A, the air coming out of a discharge port 802 of the fan 800 flows along an inner wall of the thermostat 118 as indicated by an arrow, forming a rotational flow. A portion of the rotational flow is sucked into a suction port 804 of the fan 800. While the air circulates stably near the inner wall of the thermostat 118, flow velocity of the air is lower in the center of the rotational flow away from the inner wall of the thermostat 118, causing a vortex or stagnation. When the capillary 101 is short, the capillary 101 passes through both areas where the flow velocity of the air is sufficient and the velocity of the air is lower in the thermostat 118. Accordingly, the capillary 101 has different heat radiation amount depending on the location. Thus, the temperature of the capillary may cause variation and degradation of the analysis performance.

FIG. 8B shows the air flow in the thermostat 118 when the straightening plate 210 is provided to the capillary array unit. The capillary array unit 200 according to the present embodiment is provided with the straightening plate 210 in accordance with the length of the capillary 101. The air coming out of the discharge port 802 of the fan 800 flows along the inner wall of the thermostat 118 to impinge on the straightening plate 210. The wind direction is adjusted by the straightening plate 210 so that the wind comes into contact with the capillary 101, thereby allowing for applying sufficient wind to the entire capillary 101. The straightening plate 210 according to the present embodiment does not forma flow passage along the capillary 101 but branches the air flow so as to apply the wind to the capillary 101, thereby circulating the wind uniformly in the thermostat 118. Since the temperature of the entire surface of the thermostat 118 is controlled by a Peltier element, in a case of forming a flow passage by which the wind blows along the capillary 101, there is a region where the wind is not circulated. Thus, there can be difference in temperature between the region where the wind is circulated and the region where the wind is not circulated. On the other hand, the present embodiment allows for guiding the air flow to apply the wind to the capillary 101 by branching the rotational flow of the air in the thermostat 118 due to the fan 800 by means of the straightening plate 210. Thus, since the rotational flow is circulated in the entire thermostat 118, the variation in the temperature distribution is reduced in the thermostat 118 and the analysis performance is improved. Moreover, by spacing the load header 112 and the straightening plate 210 from each other without contact, it is made possible to effectively circulate the wind in the entire thermostat 118.

Although two straightening plates 210 are provided in the present embodiment, there may be one or more than two. By providing the straightening plate 210 outside the range of motion of the capillary 101, the air flow in the thermostat 118 is controlled and also the attachability is improved. The position or the number of the straightening plates 210 may also be changed in accordance with the length of the capillary 101. In the present embodiment, by providing the straightening plate 210 to the capillary array unit 200, it is possible to attach/detach the straightening plate 210 corresponding to the length of the capillary 101 in accordance with the attachment/detachment of the capillary array unit 200. However, the straightening plate 210 may be directly attached to the thermostat 118 in addition to the capillary array unit 200, though the number of steps of the attaching procedure increases. When attaching the straightening plate 210 directly to the thermostat 118, attachment/detachment of the capillary array unit 200 is facilitated by providing the straightening plate 210 outside the range of motion of the capillary 101.

Although embodiments of the present invention have been described above, it is easily understood by those skilled in the art that the invention is not limited to the above-described embodiments but various modifications can be made within the scope of the invention described in the claims.

LIST OF REFERENCE SIGNS

100: Electrophoresis device, 101: Capillary, 102: Capillary array, 104: Electrophoresis section, 106: Liquid delivery mechanism, 108: Irradiation detection unit, 110: Capillary head, 112: Load header, 114: Cathode electrode, 116: Capillary cathode end, 118: Thermostat, 120: Buffer solution, 122: Cathode-side buffer container, 124: High voltage power supply, 126: Pump, 128: Block, 130: Polymer, 132: Polymer container, 134: Buffer solution, 136: Anode-side buffer container, 138: Anode electrode, 140: Light source, 142: Detector, 144: Detection position, 146: Detection section, 200: Capillary array unit, 202: First frame, 204: Second frame, 206: Holding section, 208: Separator, 210: Straightening plate, 212: Guide, 214(215): Heat dissipation sheet, 216: Fixture, 218: Finger hook, 220: Push-in section, 222: Knob, 300: Hole, 400: Grip, Recess 402, 500: Detection section holder, 502: Lid, 600: Set screw, 602: Sealing surface, 700: Heat dissipation sheet, 701 (702): Projection, 800: Fan, 802: Protruding port, 804: Suction port

The invention claimed is:

1. A capillary array unit comprising:
a thermostat;
a capillary housed within the thermostat;
a support that supports the capillary,
   the support comprising a first support section that holds the capillary in a curved state,
   a second support section that holds the capillary in a linear state,
   wherein the first support section includes a guide for moving the second support section in a predetermined direction; and
wherein the capillary array unit includes a straightening plate,
   the straightening plate having a flat plate-like shape, being arranged below a line on which the second support section moves, and not being arranged on the line on which the second support section moves, and
   the straightening plate being arranged to cause a rotational air flow along an inner wall of the thermostat caused in the thermostat by a fan to impinge on the straightening plate, and branching the rotational air flow into a plurality of branches of air flows, wherein at least one branch of air flow does not flow along an inner wall of the thermostat.

2. The capillary array unit according to claim 1, wherein the straightening plate is provided to a portion of a periphery of the capillary.

3. The capillary array unit according to claim 1, wherein the straightening plate is arranged in a position not contacting the capillary.

4. The capillary array according to claim 1, wherein the first support section includes a holding section that holds the second support section in a detachable manner.

5. The capillary array unit according to claim 4, wherein the straightening plate does not contact the capillary when the first support section is held by the holding section.

6. The capillary array according to claim 1, wherein the first support section includes a finger hook, and
wherein the second support section includes a pressing section.

7. The capillary array according to claim 1, wherein the second support section includes a knob.

8. The capillary array according to claim 1, wherein one end of the capillary includes a capillary head provided with a bore or a groove in a portion thereof, and
wherein the second support section includes a protrusion that engages with the bore or the groove.

9. The capillary array according to claim 1, wherein there is a radiator between the second support section and the capillary.

10. The capillary array according to claim 1, comprising:
a fixture for arranging the capillary on the second support, wherein a groove for holding the capillary is provided in the fixture or in a position on the second support section where the fixture is arranged.

11. The capillary array unit according to claim 1, wherein there is a gap between the straightening plate and a load header.

12. An electrophoresis device comprising:
a capillary array unit including a capillary and a support that supports the capillary;
   the support comprising a first support section that holds the capillary in a curved state and a second support section that holds the capillary in a linear state;
   wherein the first support section includes a guide for moving the second support section in a predetermined direction;
a liquid delivery mechanism having one end of the capillary being connected thereto and for delivering a separation medium to the capillary;
a detection unit that emits light to a portion of the capillary and performs a measurement on a sample in the capillary; and
a thermostat that houses the capillary therein and performs temperature control on the capillary,
wherein the thermostat includes a heat source and a fan that sends air into the thermostat, and
wherein the thermostat or the capillary array unit includes a straightening plate,
   the straightening plate having a flat plate-like shape, being arranged below a line on which the second support section moves, and not being arranged on the line on which the second support section moves, and
   the straightening plate being arranged to cause a rotational air flow along an inner wall of the thermostat caused in the thermostat by the fan to impinge on the straightening plate, and branch the rotational air flow into a plurality of branches of air flows, wherein at least one branch of air flow does not flow along an inner wall of the thermostat.

13. The electrophoresis device according to claim 12, wherein the straightening plate is provided to a portion of a periphery of the capillary.

14. The electrophoresis device according to claim 12, wherein the thermostat includes a heat dissipation sheet in at least a portion of a position where the capillary contacts, and wherein a portion of the second support section is wider in width than a contact position of the thermostat that includes the heat dissipation sheet.

15. The electrophoresis device according to claim 12, wherein a connection position of the capillary to the liquid delivery mechanism and a detection position of the capillary by means of the detection unit are arranged in a straight line, and wherein the straightening plate is arranged below the straight line.

16. The capillary array according to claim 1, wherein at least one branch of air flow of the plurality of branches of air flows does not form a flow passage along the capillary and applies wind to the capillary.

\*   \*   \*   \*   \*